United States Patent Office 3,012,074
Patented Dec. 5, 1961

3,012,074
CYCLOPROPYL KETOXIMES
Bruce W. Horrom, Waukegan, Ill., assignor to Abbott Laboratories, North Chicago, Ill., a corporation of Illinois
No Drawing. Filed May 16, 1958, Ser. No. 735,666
3 Claims. (Cl. 260—566)

This invention relates to novel cyclopropyl ketoximes, in particular cyclopropyl-(n)-propyl ketoxime and cyclopropyl-(iso)-propyl ketoxime. It also relates to a method of making said compounds and to a method of relaxing skeletal muscle tension.

The compounds are prepared by oximination of cyclopropyl-(n)-propyl ketone and cyclopropyl-(iso)-propyl ketone with a hydroxylammonium acid addition salt in the presence of a base. The starting ketones are well known and may be prepared by known methods, among which is the method described in Chemical Abstracts, volume 22, 582 (1928).

The compounds of this invention are useful as muscle relaxants, that is, they possess the pharmacological properties of relaxing skeletal muscle through central nervous inhibition of synaptic transmission as distinguished from peripheral acting compounds such as the curare type.

The following examples are presented to teach the invention, but such examples should not be construed as exclusive embodiments of the invention.

EXAMPLE I

*Cyclopropyl-(n)-propyl ketoxime*

A mixture of 38 grams (0.317 mole) of cyclopropyl-(n)-propyl ketone in 40 cc. of methanol and 28 grams (0.4 mole) of hydroxylammonium hydrochloride in 40 cc. of water is heated to reflux while stirring. To this mixture is added 14.5 grams (0.36 mole) of sodium hydroxide in 40 cc. of water over a 40-minute period in dropwise fashion. The mixture is stirred and refluxed for two hours after addition is completed. Following the period of refluxing, the mixture is allowed to cool and an equal volume of water is added. The resulting oil is taken up in ether and dried over magnesuim sulfate. The isolated oil is distilled, B.P. 95–98° C. (9 mm.) $N_D^{25}$ 1.4768. The product is obtained as a clear, colorless oil in a yield of 29.5 grams (75%).

*Analysis.*—Calcd. for $C_7H_{13}NO$. Calculated: C, 66.10%; H, 10.30%; N, 11.01%; O, 12.58%. Found: C, 65.99%; H, 10.10%; N, 11.67%; O, 12.61%.

EXAMPLE II

*Cyclopropyl-(iso)-propyl ketoxime*

The produce of this example is prepared according to the method set out in Example I. The starting ketone is cyclopropyl-(iso)-propyl ketone. The product is obtained directly from the reaction mixture after cooling. It is separated by filtration and obtained in a yield of 50%, M.P. 63–64° C.

*Analysis.*—Calcd. for $C_7H_{13}NO$. C, 66.10%; H, 10.30%; N. 11:01%; O, 12.58%. Found: C, 65.60%; H, 10.28%; N, 11.35%; O, 12.28%.

Others may practice the invention in any of the numerous ways which will be suggested by this disclosure to one skilled in the art. All such practice of the invention is considered to be a part hereof provided it falls within the scope of the appended claims.

I claim:
1. A compound selected from the class consisting of cyclopropyl-(n)-propyl ketoxime and cyclopropyl-(iso)-propyl ketoxime.
2. Cyclopropyl-(n)-propyl ketoxime.
3. Cyclopropyl-(iso)-propyl ketoxime.

References Cited in the file of this patent
UNITED STATES PATENTS
2,733,268     Doerner _____ Jan. 31, 1956

OTHER REFERENCES
Normant: Chemical Abstracts, vol. 46, page 3961d (1949).
Normant: Compt. rend., vol. 232, pages 1358–60 (1951).
Grob et al.: J. Am. Med. Assn., vol. 166, pages 1855–1858 (April 1958).